US010048814B2

(12) United States Patent
Mohapatra et al.

(10) Patent No.: US 10,048,814 B2
(45) Date of Patent: Aug. 14, 2018

(54) CORROSION MITIGATION FOR METAL TRACES

(71) Applicant: Apple Inc., Cupertino, CA (US)

(72) Inventors: Siddharth Mohapatra, Santa Clara, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 14/960,202

(22) Filed: Dec. 4, 2015

(65) Prior Publication Data

US 2016/0085342 A1 Mar. 24, 2016

Related U.S. Application Data

(63) Continuation of application No. 13/710,417, filed on Dec. 10, 2012, now Pat. No. 9,236,202.

(Continued)

(51) Int. Cl.
*H01H 1/10* (2006.01)
*G06F 3/044* (2006.01)
(Continued)

(52) U.S. Cl.
CPC ............ *G06F 3/044* (2013.01); *G06F 3/0416* (2013.01); *H01H 1/58* (2013.01); *H01H 11/04* (2013.01);
(Continued)

(58) Field of Classification Search
CPC ........... G06F 3/044; G06F 2203/04112; G06F 3/045; G06F 3/0416; G06F 2203/04107;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 2 290 512 A2 | 3/2011 |
| JP | 2000-163031 A | 6/2000 |

(Continued)

OTHER PUBLICATIONS

International Search Report dated Dec. 6, 2013, for PCT Application No. PCT/US2013/058634 filed Sep. 6, 2013, five pages.

(Continued)

*Primary Examiner* — Kyung Lee
(74) *Attorney, Agent, or Firm* — Morrison & Foerster LLP

(57) ABSTRACT

Processes for manufacturing touch sensors with one or more guard traces to reduce the effect of moisture damage are provided. One example process can include forming one or more guard traces between an edge of the touch sensor and the metal traces that route the drive and sense lines to bond pads. The one or more guard traces can be uncoupled from the drive lines and sense lines to protect the inner metal traces from moisture damage. In some examples, ends of the one or more guard traces can be coupled to ground by copper. In other examples, ends of the one or more guard traces can be coupled to ground by indium tin oxide or the one or more guard traces can be coupled to ground by a strip of indium tin oxide. In yet other examples, the guard trace can be floating (e.g., not coupled to ground).

10 Claims, 19 Drawing Sheets

Related U.S. Application Data

(60) Provisional application No. 61/699,229, filed on Sep. 10, 2012.

(51) Int. Cl.
  *H01H 1/58* (2006.01)
  *H01H 11/04* (2006.01)
  *G06F 3/041* (2006.01)

(52) U.S. Cl.
  CPC .............. *G06F 2203/04103* (2013.01); *G06F 2203/04107* (2013.01); *Y10T 29/49105* (2015.01)

(58) Field of Classification Search
  CPC ....... G06F 3/041; G06F 3/0412; H01H 11/04; H01H 1/58; Y10T 29/49105; Y10T 156/10; H05K 3/282; G01R 27/2605
  USPC ........................................................ 200/600
  See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,321,362 | B2 | 1/2008 | Bottari et al. |
| 7,663,607 | B2 | 2/2010 | Hotelling et al. |
| 8,068,186 | B2 | 11/2011 | Aufderheide et al. |
| 8,479,122 | B2 | 7/2013 | Hotelling et al. |
| 9,236,202 | B2 | 1/2016 | Mohapatra et al. |
| 9,259,904 | B2 * | 2/2016 | Hong ................. B32B 37/1207 |
| 2006/0197753 | A1 | 9/2006 | Hotelling |
| 2008/0074398 | A1 | 3/2008 | Wright |
| 2009/0266621 | A1 | 10/2009 | Huang et al. |
| 2009/0324899 | A1 | 12/2009 | Feinstein et al. |
| 2011/0057905 | A1 | 3/2011 | Yu et al. |
| 2011/0157071 | A1 | 6/2011 | Huang et al. |
| 2011/0254804 | A1 | 10/2011 | Kuo et al. |
| 2012/0024816 | A1 | 2/2012 | Huang et al. |
| 2012/0146942 | A1 | 6/2012 | Kamoshida et al. |
| 2012/0168779 | A1 | 7/2012 | Lee |
| 2014/0069785 | A1 | 3/2014 | Mohapatra et al. |

FOREIGN PATENT DOCUMENTS

| | | |
|---|---|---|
| JP | 2002-342033 A | 11/2002 |
| WO | WO-2005/022496 A2 | 3/2005 |
| WO | WO-2010/057059 A1 | 5/2010 |
| WO | WO-2014/039914 A1 | 3/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Apr. 9, 2015, for U.S. Appl. No. 13/710,417, filed Dec. 10, 2012, ten pages.

Notice of Allowance dated Sep. 17, 2015, for U.S. Appl. No. 13/710,417, filed Dec. 10, 2012, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

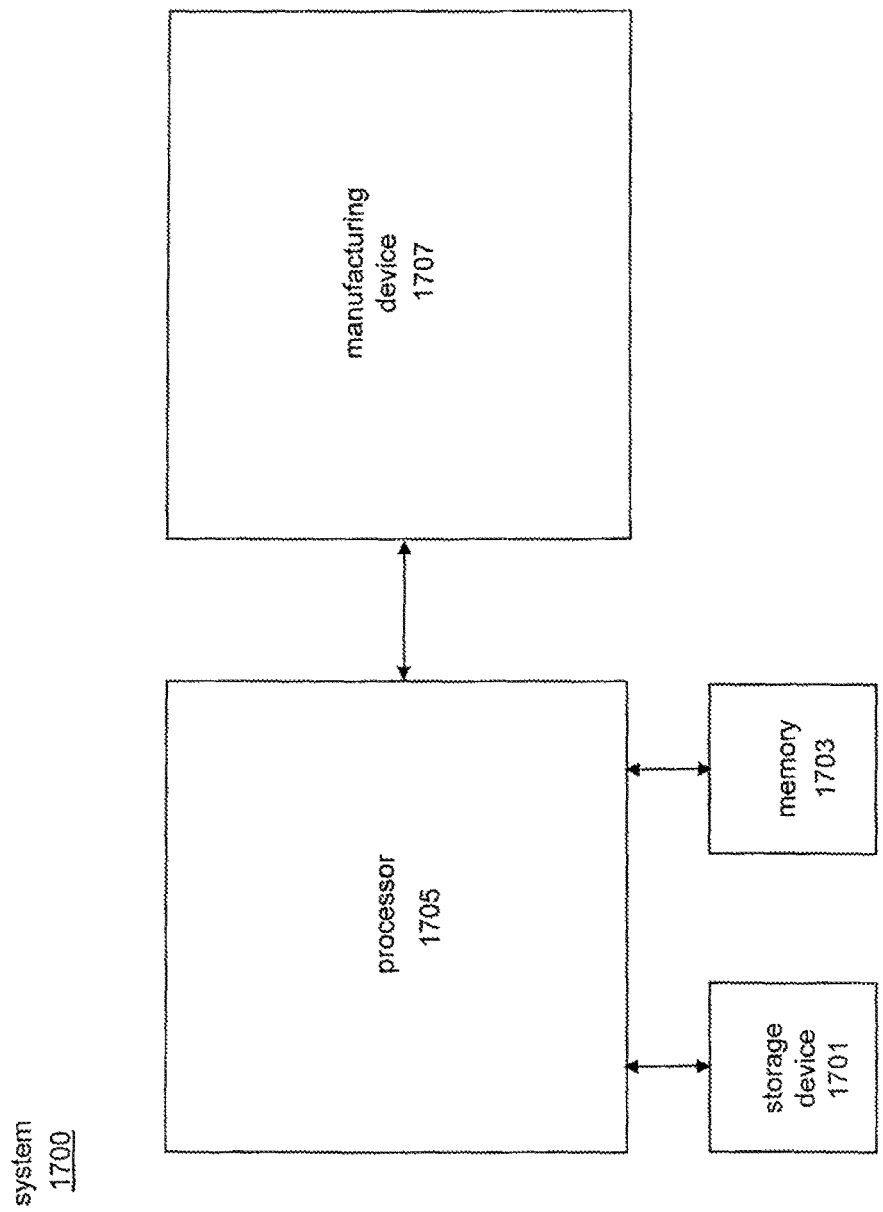

personal device 1900 personal device 1800

CORROSION MITIGATION FOR METAL TRACES

CROSS-REFERENCE TO RELATED APPLICATIONS

This application is a continuation application of U.S. patent application Ser. No. 13/710,417 filed Dec. 10, 2012 (U.S. Patent Application Publication No. 2014/0069785), which claims the benefit of U.S. Patent Application No. 61/699,229, filed Sep. 10, 2012, the contents of which are incorporated herein by reference in their entirety for all purposes.

FIELD

This relates generally to touch sensors and, more specifically, to processes for manufacturing touch sensors to reduce moisture damage.

BACKGROUND

Many types of input devices are presently available for performing operations in a computing system, such as buttons or keys, mice, trackballs, joysticks, touch sensor panels, touch screens, and the like. Touch sensitive devices, such as touch screens, in particular, are becoming increasingly popular because of their ease and versatility of operation. A touch sensitive device can include a touch sensor panel, which can be a clear panel with a touch-sensitive surface, and a display device, such as a liquid crystal display (LCD) or organic light emitting diode (OLED) display, that can be positioned partially or fully behind the panel so that the touch-sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Many processes have been developed to manufacture these touch sensors. For example, conventional roll-to-roll processes involve patterning electronic devices onto rolls of thin, flexible plastic or metal foil. These devices can then be removed from the roll using lithography or a physical cutting process. These roll-to-roll processes can reduce the amount of time and money required to manufacture touch sensors. However, conventional processes are susceptible to moisture damage. For example, moisture can propagate into the touch sensor and corrode metal traces along the edge of the device. Thus, improved touch sensor manufacturing processes are desired.

SUMMARY

This relates to processes for manufacturing touch sensors with one or more guard traces to reduce the effect of moisture damage. One example process can include forming one or more guard traces between an edge of the touch sensor and the metal traces that route the drive and sense lines to bond pads. The one or more guard traces can be uncoupled from the drive lines and sense lines and can protect the inner metal traces from moisture damage. The one or more guard traces can be formed from a metal, such as copper. In some examples, the ends of the one or more guard traces can be coupled to ground by copper. In other examples, the ends of the one or more guard traces can be coupled to ground by indium tin oxide or the one or more guard traces can be coupled to ground along a length of the one or more guard traces by a strip of indium tin oxide. In yet other examples, the guard trace can be floating (e.g., not coupled to ground).

Touch sensors manufactured using these processes are also disclosed.

BRIEF DESCRIPTION OF THE DRAWINGS

FIG. 17 illustrates an exemplary system for manufacturing a touch sensor having a guard trace according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to processes for manufacturing touch sensors with one or more guard traces to reduce the effect of moisture damage. The process can include forming one or more guard traces between an edge of the touch sensor and the metal traces that route the drive and sense lines to bond pads. The one or more guard traces can be uncoupled from the drive lines and sense lines and can protect the inner metal traces from moisture damage. The one or more guard traces can be formed from a metal, such as copper. In some examples, the ends of the one or more guard traces can be coupled to ground by copper. In other examples, the ends of the one or more guard traces can be coupled to ground by indium tin oxide or the one or more guard traces can be coupled to ground along a length of the one or more guard traces by a strip of indium tin oxide. In yet other examples, the guard trace can be floating (e.g., not coupled to ground). Touch sensors manufactured using these processes are also disclosed.

Figure 1:
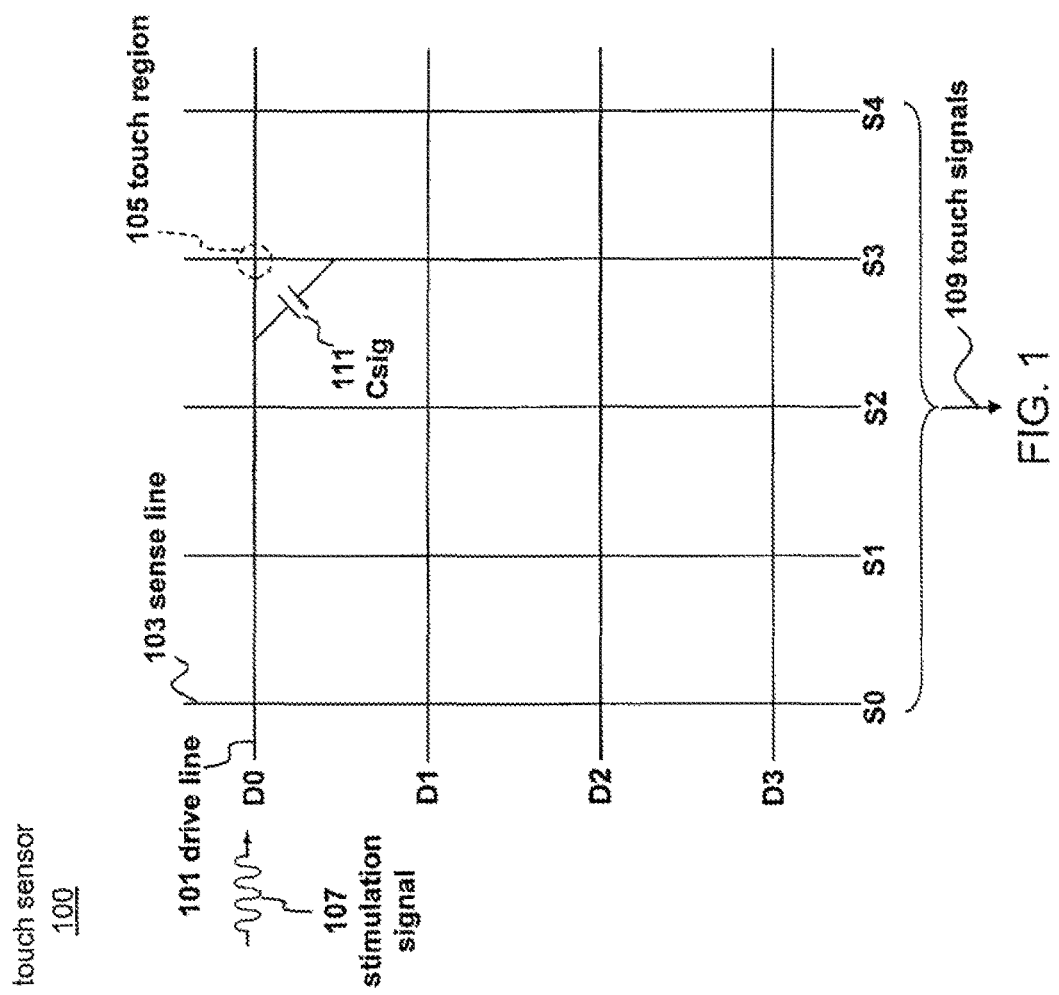
FIG. 1 illustrates an exemplary touch sensor according to various examples.

FIG. 1 illustrates touch sensor 100 that can be used to detect touch events on a touch sensitive device, such as a mobile phone, tablet, touchpad, portable computer, portable media player, or the like. Touch sensor 100 can include an array of touch regions or nodes 105 that can be formed at the crossing points between rows of drive lines 101 (D0-D3) and columns of sense lines 103 (S0-S4). Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can transmit touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be transmitted by the sense lines 103 to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Figure 2:
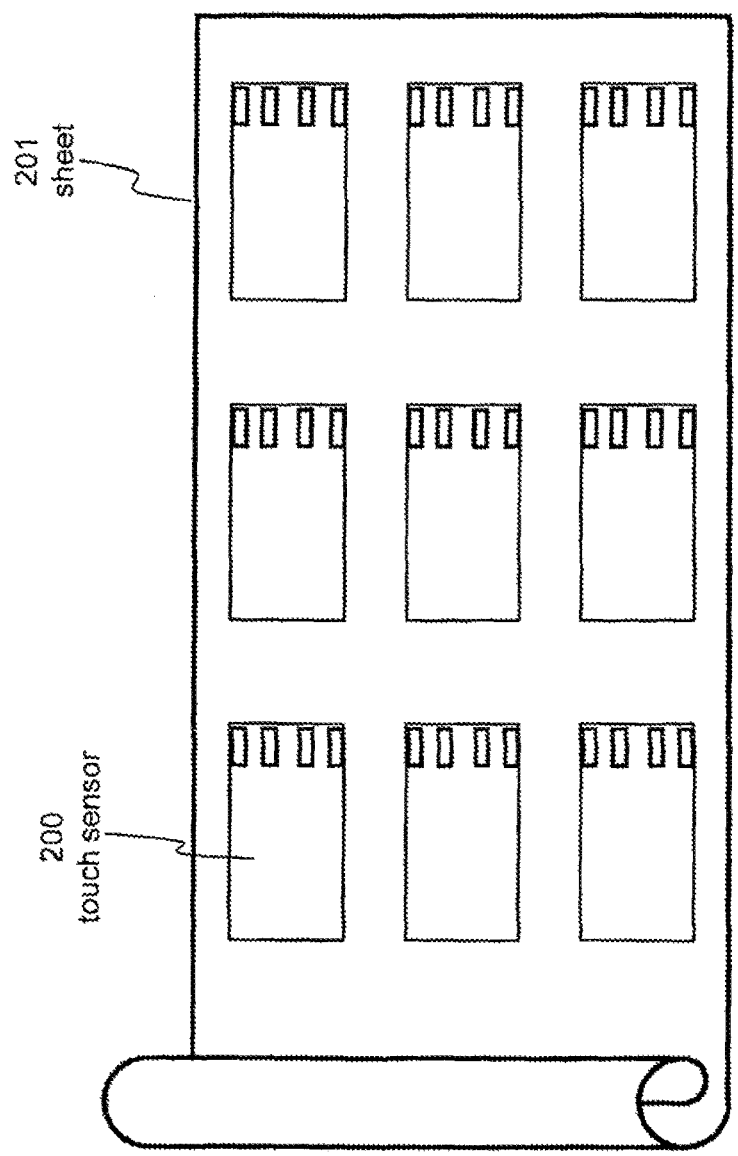
FIG. 2 illustrates an exemplary mother sheet containing multiple touch sensors according to various examples.

Touch sensors, such as touch sensor 100, can be manufactured in various ways. For example, touch sensors can be manufactured using a roll-to-roll process that involves patterning the touch sensor onto rolls of thin, flexible plastic or metal foil. These devices can then be removed from the roll using lithography or a physical cutting process. To illustrate, FIG. 2 shows multiple touch sensors 200 similar or identical to touch sensor 100 formed on a sheet of base film 201. In some examples, the sheet of base film 401 can include a flexible plastic material, such as cyclo olefin polymer (COP). In these examples, layers of dry film resist (DFR) can be applied to the sheet of base film 201 to be used as a mask to pattern the drive lines, sense lines, bond pads, metal traces, and the like, of the touch sensor 200. Once the touch sensors 200 are patterned onto the sheet of base film 201, the touch sensors can be cut from the sheet of base film 201, producing individual touch sensors 200, such as that shown in FIG. 3.

Figure 3:
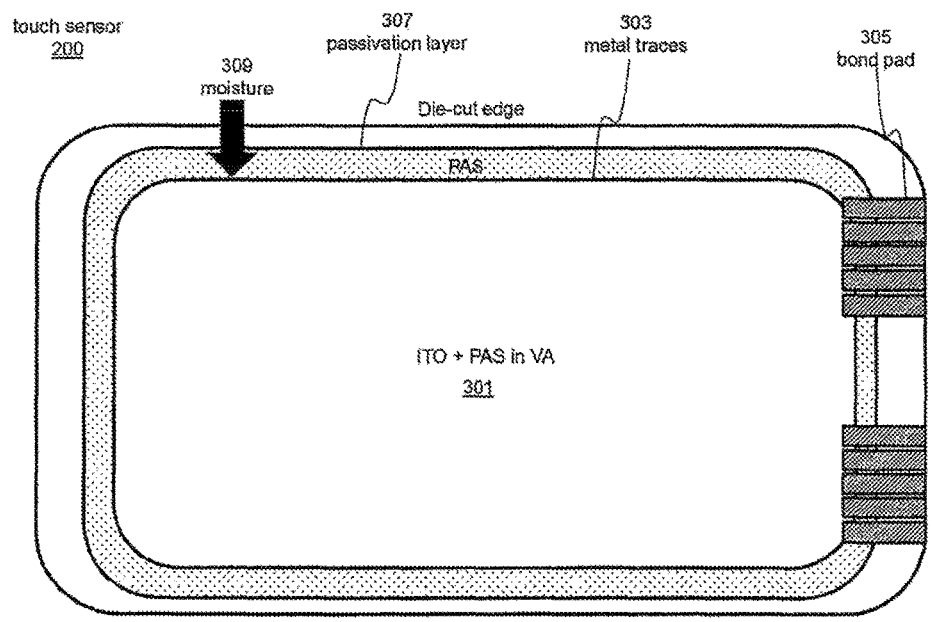
FIG. 3 illustrates a top view of an exemplary touch sensor according to various examples.

FIG. 3 illustrates a top-view of an exemplary touch sensor 200 that can be made using various manufacturing techniques, such as a roll-to-roll process as described above with respect to FIG. 2. Touch sensor 200 can generally include viewable area 301, which can include drive lines and sense lines similar or identical to drive lines 101 and sense lines 103 made from a transparent, or at least substantially transparent, material, such as indium tin oxide (ITO), silicon oxide, other transparent oxides, or the like. Touch sensor 200 can further include metal traces 303 along the edges of touch sensor 200. Metal traces 303 can be made from copper or other metal, and can be coupled between the drive lines or sense lines of viewable area 301 and bond pads 305. Bond pads 305 can be used to couple the drive lines and sense lines of viewable area 301 to circuitry for driving the drive lines and circuitry for interpreting touch signals from the sense lines. Touch sensor 200 can further include a passivation layer 307 covering metal traces 303 and viewable area 301 that is laminated or otherwise adhered to the sheet of base film 201. Ideally, the passivation layer 307 can form a perfect seal along the interface between passivation layer 307 and sheet of base film 201. However, due to manufacturing defects and other factors, small gaps can be formed between passivation layer 307 and the sheet of base film 201. As a result, unwanted moisture 309 can enter the device via these gaps and can cause corrosion of the metal traces 303.

To prevent or reduce the effects of moisture damage, one or more guard traces according to various examples of the present disclosure can be used. The one or more guard traces can be formed from a metal, such as copper, and can be located between metal traces 303 and the edge of the touch sensor. The one or more guard traces can be uncoupled from the drive and sense lines of the touch sensor. In this way, the one or more guard traces can act as a "sacrificial" trace to absorb moisture damage that would otherwise occur to metal traces 303.

Figure 4:
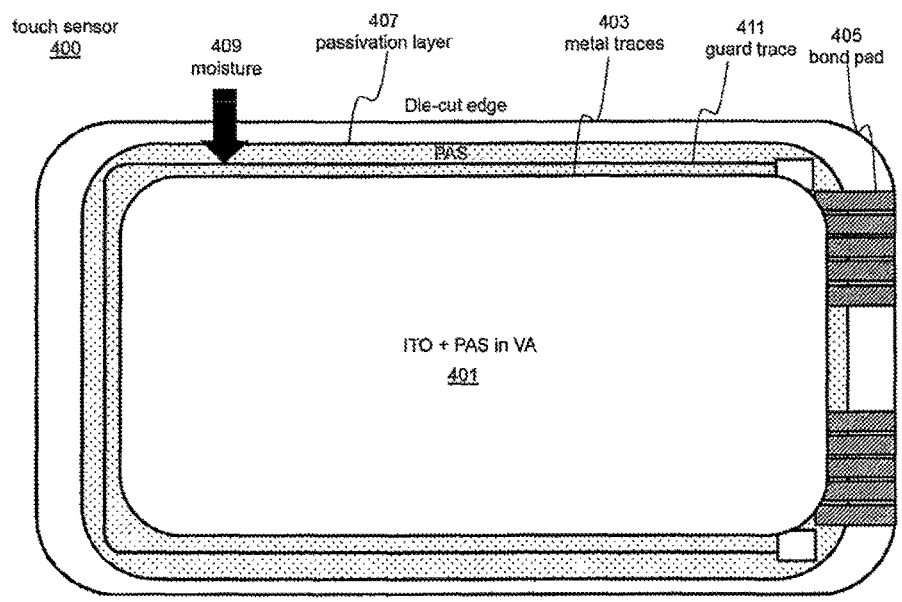
FIG. 4 illustrates a top view of an exemplary touch sensor having a guard trace according to various examples.

FIG. 4 illustrates a touch sensor 400 having a guard trace 411. Touch sensor 400 can include a viewable area 401, metal traces 403, bond pads 405, and passivation layer 407 similar or identical to viewable area 301, metal traces 303, bond pads 305, and passivation layer 307 of touch sensor 200. However, touch sensor 400 can further include a guard trace 411 located between metal traces 403 and the die-cut edge of touch sensor 400. Unlike metal traces 403, guard trace 411 may not be coupled to drive lines or sense lines of viewable area 401. Guard trace 411 can be made from copper or other metal and can be used to protect metal traces 403 from moisture 409. Specifically, guard trace 411 can protect metal traces 403 by blocking or absorbing moisture 409 entering the device. Since moisture damage is typically limited to the outermost metal trace, the guard trace 411 can be corroded while the metal traces 403 will likely remain intact. Since guard trace 411 is not used to couple drive lines or sense lines to bond pads 405, moisture damage to the guard trace will have a minimal effect on the performance of the touch sensor.

In the illustrated example, guard trace 411 is floating (e.g., not coupled to metal traces 403 or bond pads 405) and includes a single metal trace. In some examples, the width of guard trace 411 can be the same as the widths of metal traces 403. In other examples, the width of guard traces 411 can be greater or less than the widths of metal traces 403. In yet other examples, multiple guard traces 411 can be included within touch sensor 400. These and other factors can be varied based on the design of touch sensor 400 to protect metal traces 403 from moisture damage.

Figure 5:
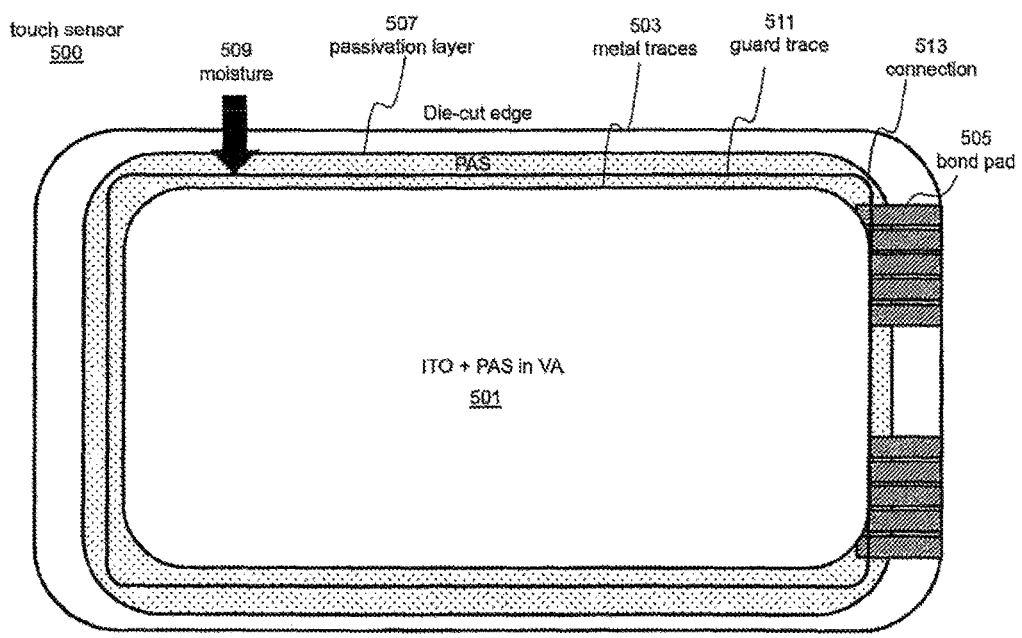
FIG. 5 illustrates a top view of an exemplary touch sensor having a guard trace coupled to ground by a metal connection point according to various examples.

FIG. 5 illustrates another exemplary touch sensor 500 having a guard trace 511. Touch sensor 500 can include a viewable area 501, metal traces 503, bond pads 505, passivation layer 507, and guard trace 511 similar or identical to viewable area 401, metal traces 403, bond pads 405, passivation layer 407, and guard trace 411 of touch sensor 400. However, touch sensor 500 can include a connection point 513 that couples ends of guard trace 511 to one or more outer traces of metal traces 503, thereby coupling guard trace 511 to ground. Connection point 513 can be formed by extending guard trace 511 to contact the outer trace(s) of metal traces 503 or bond pad(s) 505. Guard trace 511 can be coupled to ground using connection point 513 to prevent the inclusion of floating metal (e.g., metal that is not coupled to ground), which can have a detrimental effect on the performance of touch sensor 500. Similar to guard trace 411, in some examples, the width of guard trace 511 can be the same as the widths of metal traces 503. In other examples, the width of guard traces 511 can be greater or less than the widths of metal traces 503. In yet other examples, multiple guard traces 511 can be included within touch sensor 500. These and other factors can be varied based on the design of touch sensor 500 to protect metal traces 503 from moisture damage.

Figure 6:
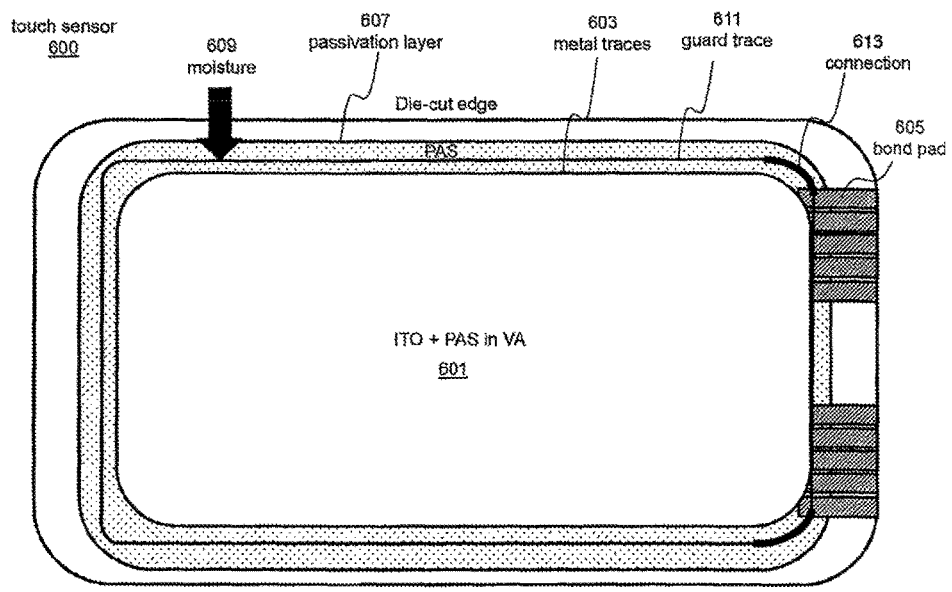
FIG. 6 illustrates a top view of an exemplary touch sensor having a guard trace coupled to ground by an indium tin oxide connection point according to various examples.

FIG. 6 illustrates another exemplary touch sensor 600 having a guard trace 611. Touch sensor 600 can include a viewable area 601, metal traces 603, bond pads 605, passivation layer 607, and guard trace 611 similar or identical to viewable area 501, metal traces 503, bond pads 505, passivation layer 507, and guard trace 511 of touch sensor 500. However, connection point 613 can be made from a non-metal material, such as indium tin oxide (ITO). In cases of severe moisture damage, corrosion of metal can be propagated along the length of the metal. Thus, ITO can be used for connection point 613 to prevent corrosion from propagating along guard trace 611 to bond pad 605 and the connected outer trace of metal traces 603. Similar to guard trace 511, in some examples, the width of guard trace 611 can be the same as the widths of metal traces 603. In other examples, the width of guard traces 611 can be greater or less than the widths of metal traces 603. In yet other examples, multiple guard traces 611 can be included within touch sensor 600. These and other factors can be varied based on the design of touch sensor 600 to protect metal traces 603 from moisture damage.

Figure 7:
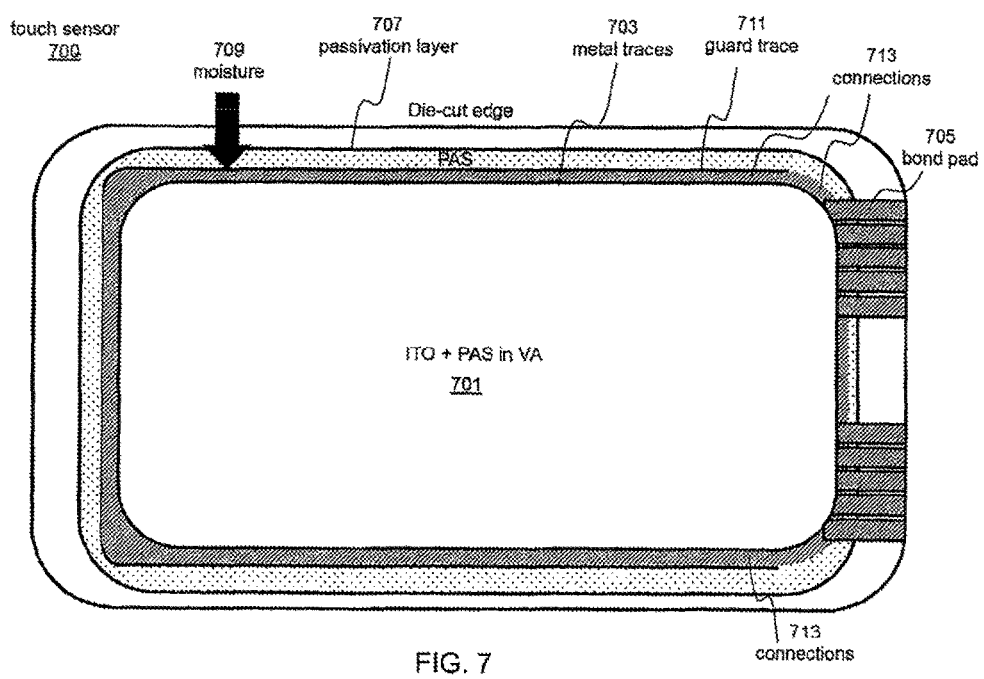
FIG. 7 illustrates a top view of an exemplary touch sensor having a guard trace coupled to ground by a strip of indium tin oxide according to various examples.

FIG. 7 illustrates another exemplary touch sensor 700 having a guard trace 711. Touch sensor 700 can include a viewable area 701, metal traces 703, bond pads 705, passivation layer 707, and guard trace 711 similar or identical to viewable area 601, metal traces 603, bond pads 605, passivation layer 607, and guard trace 611 of touch sensor 600. However, guard trace 711 can be coupled to the outer trace of metal traces 703 at all locations along guard trace 711. Specifically, the area between guard trace 711 and the outer trace of metal traces 703 can be filled with a non-metal material, such as ITO. This configuration advantageously couples guard trace 711 to ground, prevents the propagation of corrosion from guard trace 711 to metal traces 703, and reduces the resistance of the outer trace of metal traces 703. Similar to guard trace 611, in some examples, the width of guard trace 711 can be the same as the widths of metal traces 703. In other examples, the width of guard traces 711 can be greater or less than the widths of metal traces 703. In yet other examples, multiple guard traces 711 can be included within touch sensor 700. These and other factors can be varied based on the design of touch sensor 700 to protect metal traces 703 from moisture damage.

In some examples, the one or more guard traces of touch sensors 400, 500, 600, or 700 can be coupled to one or more drive lines or sense lines along an edge of the viewable area of the device. The drive circuitry or sense circuitry coupled to these guard traces can be configured to detect an open circuit (e.g., due to corrosion of the guard trace) and can cease driving the associated drive line(s) or ignore the touch signal(s) received from the associated sense line(s). In these examples, the guard traces can still be used to couple drive lines or sense lines to the bond pads while intact, and only a minimal decrease in touch sensor performance will be experienced if/when the guard trace corrodes.

Figure 8:
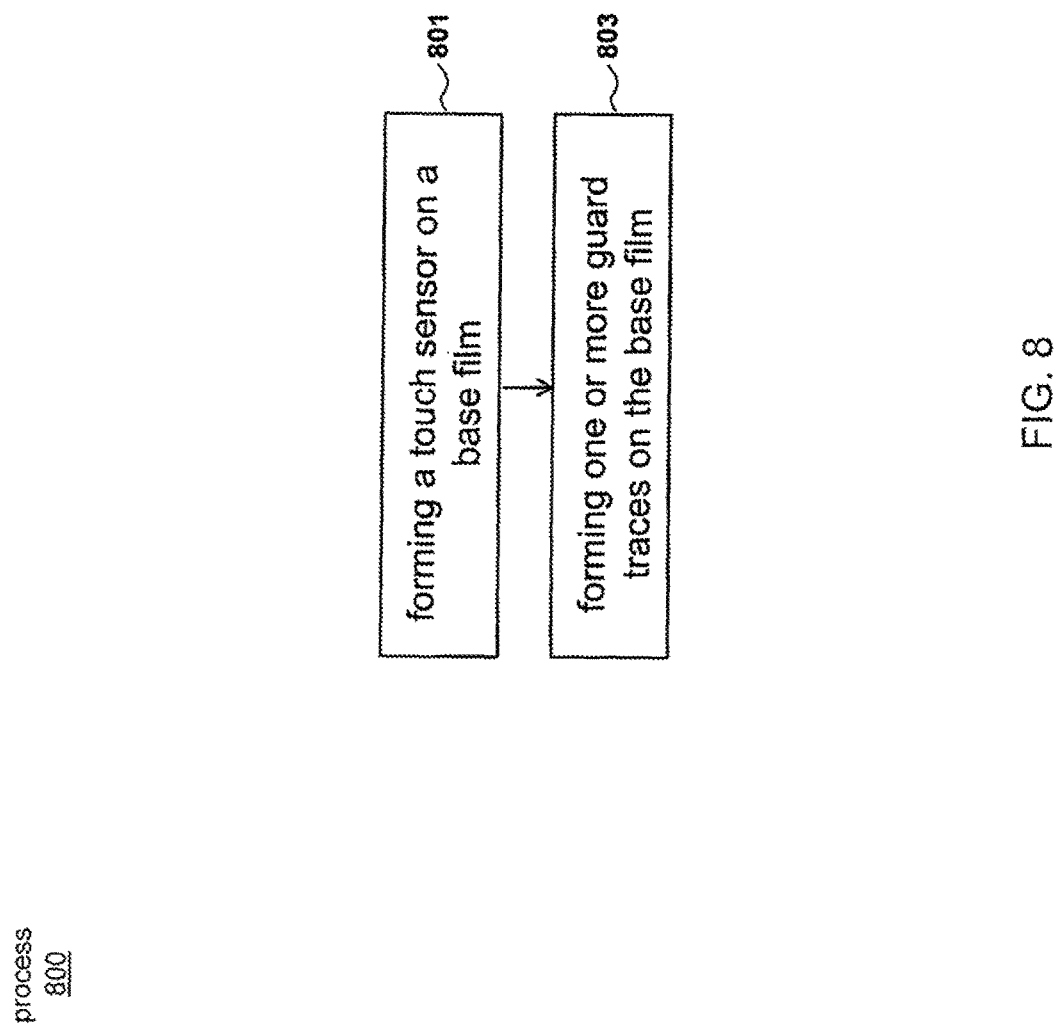
FIG. 8 illustrates an exemplary process for manufacturing a touch sensor having a guard trace according to various examples.

FIG. 8 illustrates an exemplary process for manufacturing a touch sensor having one or more guard traces. At block 801, a touch sensor can be formed on a base film. In some examples, the sheet of base film can include a flexible plastic material, such as cyclo olefin polymer (COP), and a touch sensor similar or identical to touch sensors 400, 500, 600, or 700 can be formed on the sheet of base film using any known patterning technique, such as deposition or photolithography. As one example, FIGS. 9-16 illustrate the formation of a touch sensor on a sheet of COP base film 201 at various stages of manufacture using an exemplary etching process.

Figure 9:
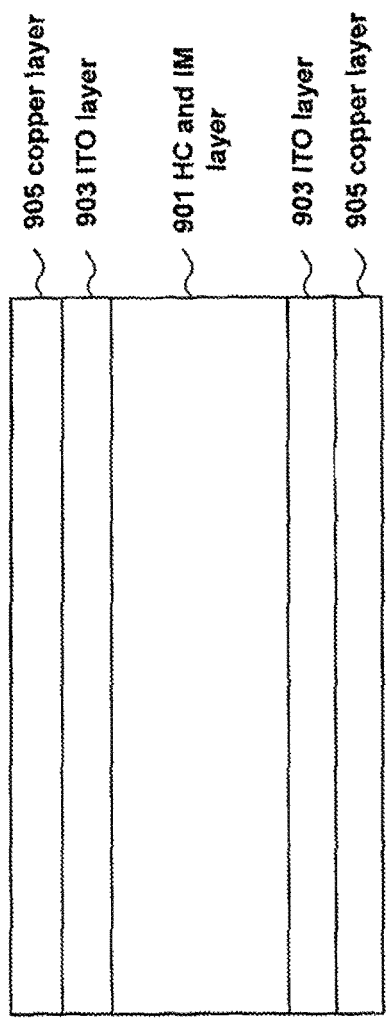
FIGS. 9-16 illustrate a touch sensor at various stages of manufacture according to various examples.
Figure 10:
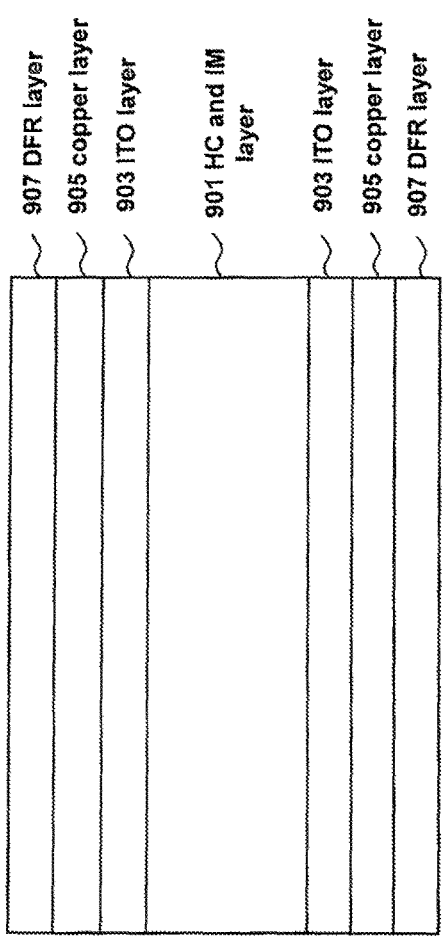
Figure 11:
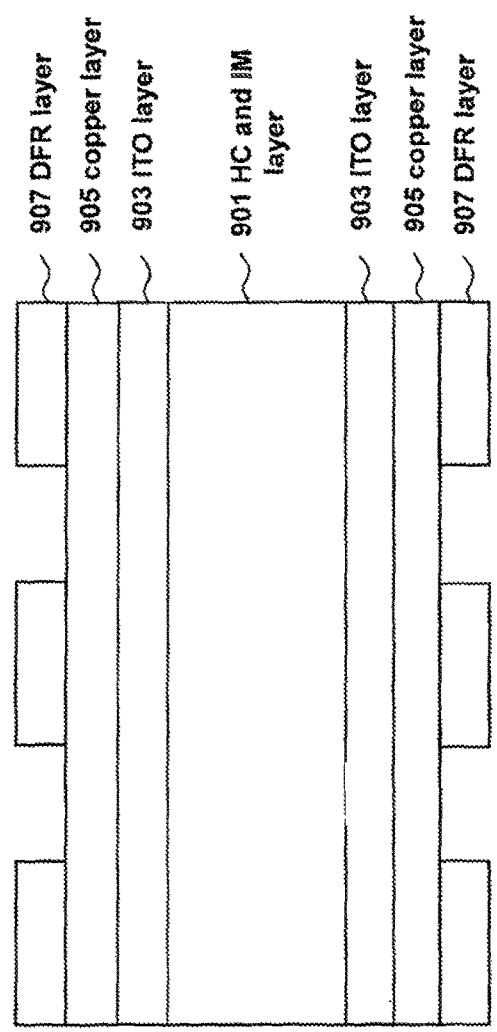
Figure 12:
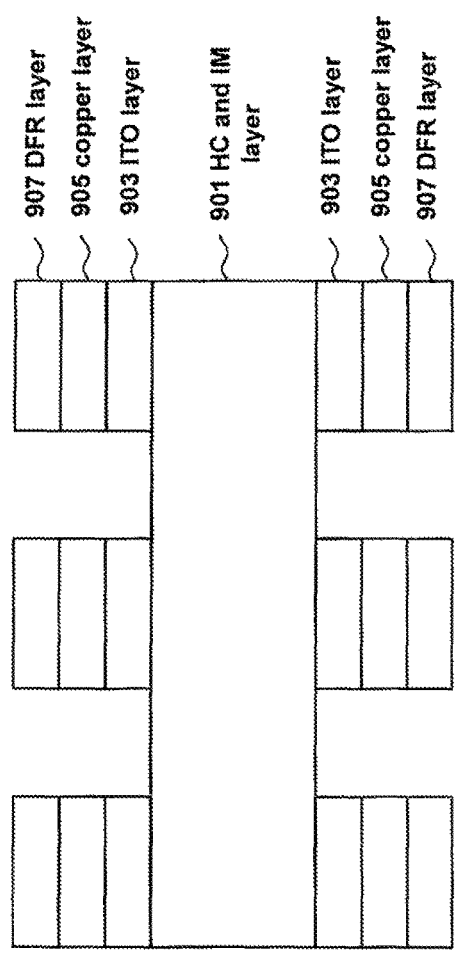
Figure 13:
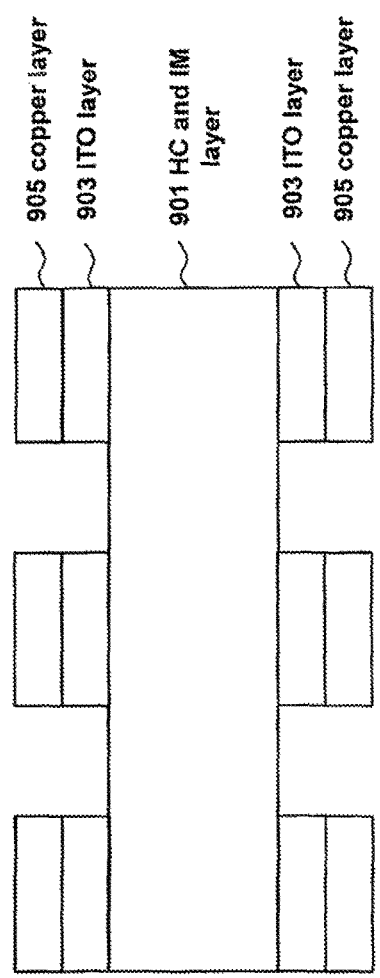
Figure 14:
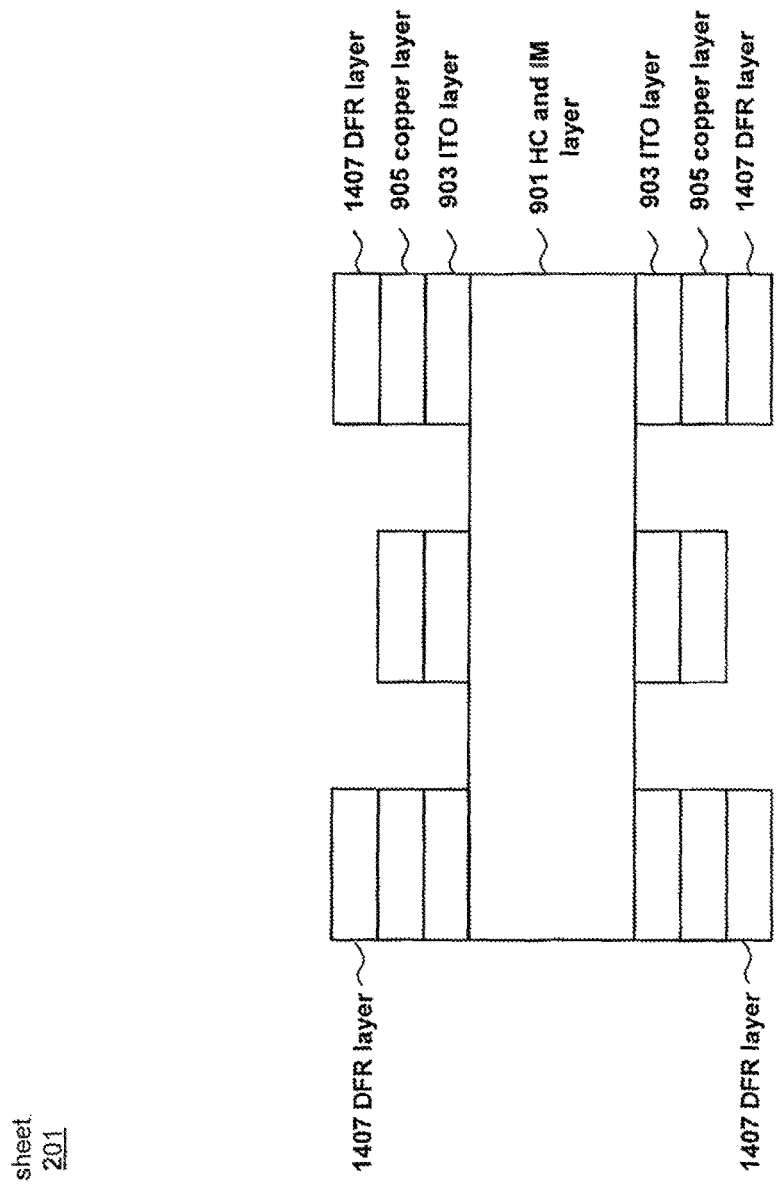
Figure 15:
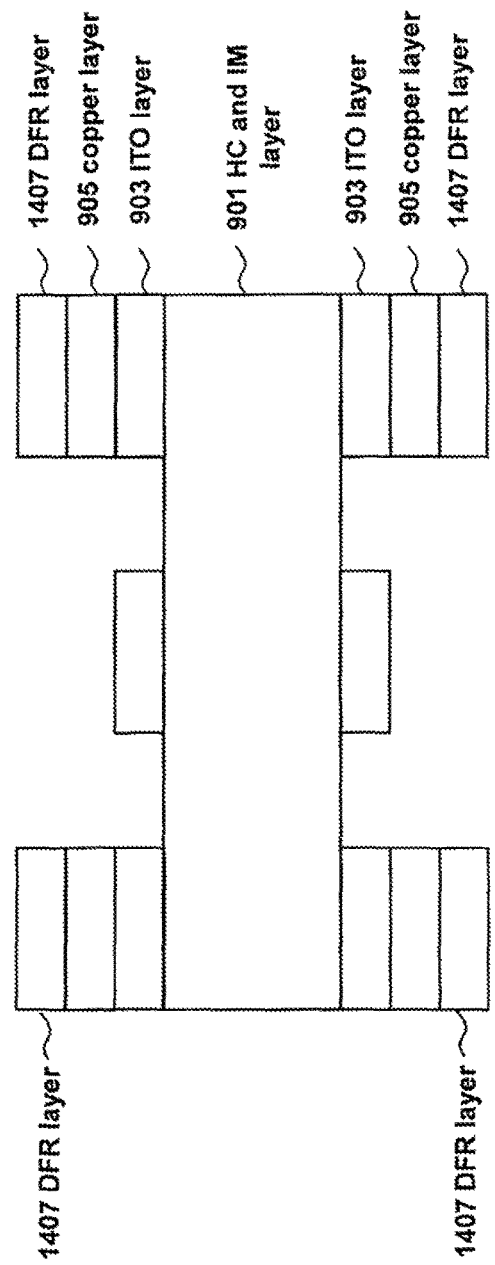
Figure 16:
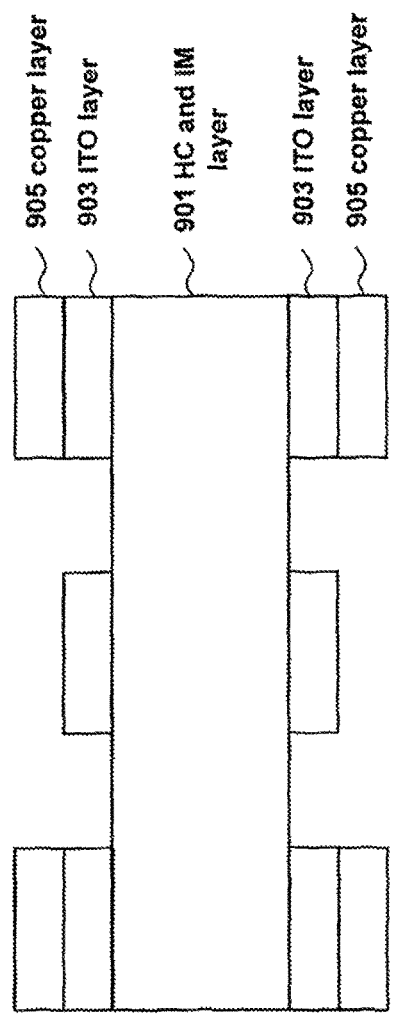

Initially, FIG. 9 illustrates an exemplary sheet of COP base film 201 having a hard-coat (HC) layer, index matching (IM) layer, indium tin oxide (ITO) layer 903, and copper layer 905. The HC layer and IM layer have been combined into a single HC and IM layer 901 for simplicity, but it should be appreciated that these layers can be separate layers. To form the touch sensor on the sheet of COP base film 201, a layer of dry film resist (DFR) 907 can be laminated onto the copper layer 905 of the sheet of COP base film 201, as shown in FIG. 10. Portions of the DFR layer 907 can then be etched away to define the metal traces, drive lines, sense lines, and bond pads of the touch sensor, as shown in FIG. 11. For example, portions of DFR layer 907 can be etched away to define the drive lines and sense lines within viewable area 401, 501, 601, or 701, metal traces 403, 503, 603, or 703, and bond pads 405, 505, 605, or 705. Specifically, portions of DFR layer 907 above the drive lines, sense lines, metal traces, and bond pads can be left intact while the remaining portions of DFR layer 907 can be etched away. Using the remaining DFR layer 907 as a mask, portions of copper layer 905 and ITO layer 903 can be etched using an appropriate etchant, as shown in FIG. 12. The remaining DFR layer 907 can then be etched away, as shown in FIG. 13. A second DFR layer 1407 can then be deposited on portions of sheet 201 corresponding to the metal traces and bond pads of the touch sensor, as shown in FIG. 14. For example, a second DFR layer 1407 can be deposited onto metal traces 403, 503, 603, or 704 and bond pads 405, 505, 605, or 705 of the touch sensor. Using the second DFR layer 1407 as a mask, portions of copper layer 905 can be etched away, as shown in FIG. 15. In the example where the second DFR layer 1407 is deposited onto metal traces 403, 503, 603, or 703 and bond pads 405, 505, 605, or 705 of the touch sensor, the portions of copper layer 905 within viewable area 401, 501, 601, or 701 can be removed. The second DFR layer 1407 can then be etched away, leaving the drive lines, sense lines, metal traces, and bond pads of the touch sensor, as shown in FIG. 16. For example, using the example provided above, drive lines formed of ITO, sense lines formed of ITO, metal traces formed of copper and ITO, and bond pads formed of copper and ITO can be created using this exemplary etching process.

Referring back to process 800 of FIG. 8, after forming the touch sensor on the base film at block 801, the process can proceed to block 803. At block 803, one or more guard traces can be formed on the base film. For example, guard traces similar or identical to guard traces 411, 511, 611, or 711 can be formed on a sheet of base film 201 such that they are positioned between an edge of the touch sensor and an outer metal trace, as shown in FIGS. 4-7. In some examples, the guard trace can be formed using known patterning techniques, such as deposition or photolithography. In other examples, an etching process similar or identical to that described above with respect to FIGS. 9-16 can be used. In yet other examples, the guard traces can be formed at the same time as the formation of the touch sensor at block 801. For instance, the DFR layer 907 can be deposited over an area of sheet 201 corresponding to drive lines, sense lines, metal traces, bond pads, and guard traces to prevent etching of the underlying portions of copper layer 905 and ITO layer 903 in these areas. After etching, the first DFR layer 907 can be removed. The second DFR layer 1407 can then be deposited over an area of sheet 201 corresponding metal traces, bond pads, and guard traces to prevent etching of the underlying portions of copper layer 905 and ITO layer 903 in these areas, resulting in copper metal traces, bond pads, and guard traces. The second DFR layer 1407 can then be removed. Once complete, the touch sensor can be cut or otherwise removed from the sheet of base film 201.

FIGS. 9-16 show the patterning of both sides of the sheet of base film 201. It should be appreciated that different components of the touch sensor can be patterned on each side of the sheet of base film 201. For example, the drive lines and associated metal traces can be patterned on the bottom of the sheet of base film 201, while the sense lines and associated on traces can be patterned on the top of the sheet of base film 201. In some examples, the guard traces can be patterned on the same side of the sheet of base film 201 as the drive lines and associated metal traces since those metal traces are typically positioned along the edge of the touch sensor. In other examples, the guard traces can be patterned on the same side of the sheet of base film 201 as the sense lines and associated metal traces. In yet other examples, the guard traces can be patterned on both sides of the sheet of base film 201. One of ordinary skill in the art can arrange the components of the touch sensor based on its desired application.

One or more of the functions relating to the manufacturing of a touch sensitive device having one or more guard traces can be performed by a system similar or identical to system 1700 shown in FIG. 17. System 1700 can include instructions stored in a non-transitory computer readable storage medium, such as memory 1703 or storage device 1701, and executed by processor 1705. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

System 1700 can further include manufacturing device 1707 coupled to processor 1705. Manufacturing device 1707 can be operable to form a touch sensor or other electronic device on a base film and remove the touch sensor or electronic device from the base film, as discussed above with respect to FIG. 8. Processor 1705 can control manufacturing device 1707 and its components to generate a desired pattern of metal traces, drive lines, sense lines, bond pads, and guard traces in a manner similar or identical to that described above with respect to process 800.

It is to be understood that the system is not limited to the components and configuration of FIG. 17, but can include other or additional components in multiple configurations according to various examples. Additionally, the components of system 1700 can be included within a single device, or can be distributed between two manufacturing device 1707, in some examples, processor 1705 can be located within manufacturing device 1707.

Figure 18:
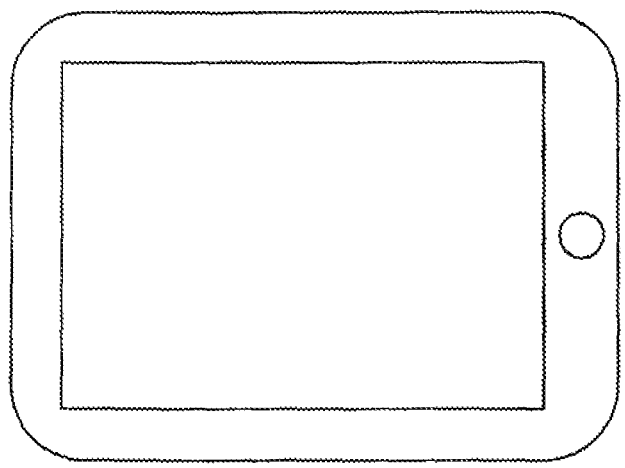

FIG. 18 illustrates an exemplary personal device 1800, such as a tablet, that can include a touch sensor having one or more guard traces according to various examples.

Figure 19:
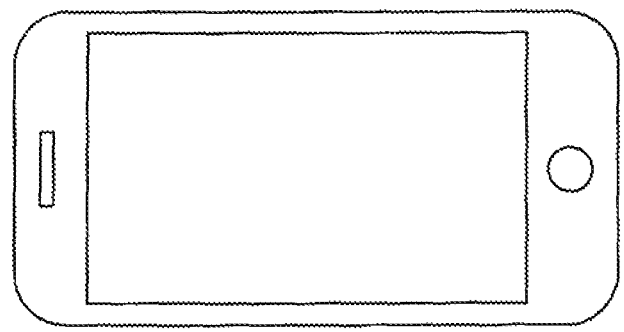
FIGS. 18-21 illustrate exemplary personal devices having a touch sensor manufactured with a guard trace according to various examples.

FIG. 19 illustrates another exemplary personal device 1900, such as a mobile phone, that can include a touch sensor having one or more guard traces according to various examples.

Figure 20:
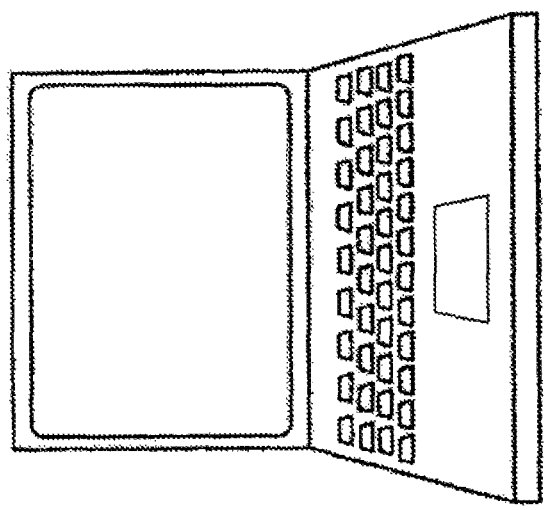

FIG. 20 illustrates an exemplary personal device 2000, such as a laptop having a touchpad that can include a touch sensor having one or more guard traces according to various examples.

Figure 21:
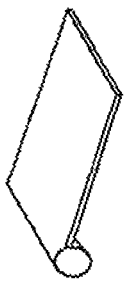

FIG. 21 illustrates another exemplary personal device 2100, such as a touch pad, that can include a touch sensor having one or more guard traces according to various examples.

Therefore, according to the above, some examples of the disclosure are directed to a touch sensor comprising: a plurality of sense lines; a plurality of drive lines; one or more bond pads; a plurality of metal traces that couple together the one or more bond pads with the plurality of sense lines and the plurality of drive lines; and a guard trace positioned between edges of the touch sensor and the plurality of conductive traces. Additionally or alternatively to one or more of the examples disclosed above, the guard trace can be uncoupled from the plurality of sense lines and the plurality of drive lines. Additionally or alternatively to one or more of the examples disclosed above, the guard trace can be coupled to a sense line of the plurality of sense lines or a drive line of the plurality of drive lines, and the guard trace can be coupled to drive circuitry or sense circuitry operable to detect an open circuit in the guard trace. Additionally or alternatively to one or more of the examples disclosed above, the touch sensor can comprise a plurality of guard traces positioned between edges of the touch sensor and the plurality of conductive traces. Additionally or alternatively to one or more of the examples disclosed above, the guard trace can be coupled to a metal trace of the plurality of metal traces.

Some examples of the disclosure are directed to a touch sensor comprising: a plurality of conductive traces that couple together one or more bond pads with a plurality of sense lines and a plurality of drive lines; and a conductive guard trace positioned between an edge of the touch sensor and the plurality of conductive traces, wherein the conductive guard trace is coupled to one or more outer traces of the plurality of conductive traces. Additionally or alternatively to one or more of the examples disclosed above, the conductive guard trace can be coupled to the one or more outer traces of the plurality of conductive traces by copper. Additionally or alternatively to one or more of the examples disclosed above, the conductive guard trace can be coupled to the one or more outer traces of the plurality of conductive traces by indium tin oxide. Additionally or alternatively to one or more of the examples disclosed above, the indium tin oxide can be positioned along the conductive guard trace and between the conductive guard trace and the one or more outer traces of the plurality of conductive traces. Additionally or alternatively to one or more of the examples disclosed above, the indium tin oxide can be coupled between ends of the conductive guard trace and the one or more outer traces of the plurality of conductive traces.

Some examples of the disclosure are directed to a touch sensor comprising: a plurality of sense lines; a plurality of drive lines; one or more bond pads; and a plurality of conductive traces, wherein a first subset of the plurality of conductive traces is uncoupled from the plurality of sense lines and the plurality of drive lines, and wherein a second subset of the plurality of conductive traces couple together the one or more bond pads with the plurality of sense lines and the plurality of drive lines. Additionally or alternatively to one or more of the examples disclosed above, the touch sensor can comprise an indium tin oxide connector coupled between ends of the first subset of the plurality of conductive traces and one or more outer traces of the second subset of the plurality of conductive traces. Additionally or alternatively to one or more of the examples disclosed above, the touch sensor can comprise a strip of indium tin oxide along the first subset of the plurality of conductive traces and between the first subset of the plurality of conductive traces and the second subset of the plurality of conductive traces. Additionally or alternatively to one or more of the examples disclosed above, the first subset of the plurality of conductive traces can comprise copper. Additionally or alternatively to one or more of the examples disclosed above, the first subset of the plurality of conductive traces can be positioned between an edge of the touch sensor and the second subset of the plurality of conductive traces. Additionally or alternatively to one or more of the examples disclosed above, ends of the first subset of the plurality of conductive traces can be coupled to one or more outer traces of the second subset of the plurality of conductive traces by copper.

Some examples of the disclosure are directed to a method for manufacturing a touch sensor, the method comprising: forming a plurality of sense lines; forming a plurality of drive lines; forming one or more bond pads; and forming a plurality of conductive traces, wherein a first subset of the plurality of conductive traces is uncoupled from the plurality of sense lines and the plurality of drive lines, and wherein a second subset of the plurality of conductive traces couple together the one or more bond pads with the plurality of sense lines and the plurality of drive lines. Additionally or alternatively to one or more of the examples disclosed above, the first subset of the plurality of conductive traces can be positioned between an edge of the touch sensor and the second subset of the plurality of conductive traces. Additionally or alternatively to one or more of the examples disclosed above, a conductive trace of the first subset of the plurality of conductive traces can be coupled to an outer trace of the second subset of the plurality of conductive traces. Additionally or alternatively to one or more of the examples disclosed above, the first subset of the plurality of conductive traces can be coupled to an outer trace of the second subset of the plurality of conductive traces. Additionally or alternatively to one or more of the examples disclosed above, the plurality of conductive traces can comprise a metal.

Some examples of the disclosure are directed to a method for manufacturing a touch sensor, the method comprising: forming a plurality of conductive traces that couple together one or more bond pads with a plurality of sense lines and a plurality of drive lines; and forming a conductive guard trace positioned between edges of the touch sensor and the plurality of conductive traces, wherein the conductive guard trace is coupled to an outer trace of the plurality of conductive traces. Additionally or alternatively to one or more of the examples disclosed above, the conductive guard trace can be coupled to ground. Additionally or alternatively to one or more of the examples disclosed above, the conductive guard trace can be coupled to ground by copper or indium tin oxide. Additionally or alternatively to one or more of the examples disclosed above, the guard trace can be uncoupled from the plurality of sense lines and the plurality of drive lines.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A touch sensor panel comprising:
   a plurality of touch nodes, each touch node configured for forming a self-capacitance to ground;
   one or more bond pads;
   a plurality of routing traces that electrically couples the plurality of touch nodes to the one or more bond pads and circuitry; and
   a trace positioned between edges of the touch sensor panel and the plurality of routing traces, the trace configured to at least one of block, absorb, and detect moisture.

2. The touch sensor panel of claim 1, wherein the trace is electrically decoupled from the plurality of touch nodes.

3. The touch sensor panel of claim 1, wherein the trace includes copper.

4. The touch sensor panel of claim 1, wherein the trace includes indium tin oxide (ITO).

5. The touch sensor panel of claim 1, further comprising:
circuitry coupled to the trace and configured to detect an open circuit.

6. The touch sensor panel of claim 1, wherein the circuitry is configured to stimulate the plurality of touch nodes or sense a capacitance from the plurality of touch nodes.

7. The touch sensor panel of claim 1, wherein a width of the trace is greater or less than a width of the plurality of routing traces.

8. The touch sensor panel of claim 1, further comprising:
a second trace configured to at least one of block, absorb, and detect moisture.

9. A method of manufacturing a touch sensor panel, the method comprising:
forming a plurality of touch nodes, each touch node configured to form a self-capacitance to ground;
forming a plurality of routing traces electrically coupled to circuitry; and
forming and locating a trace between edges of the touch sensor panel and the plurality of routing traces, the trace configured to at least one of block, absorb, and detect moisture.

10. The method of claim 9, wherein the trace is formed on a same layer as the plurality of touch nodes and the plurality of routing traces.

\* \* \* \* \*